May 11, 1954  R. M. VAUGHN  2,677,985
SLOTTED SCREW HEAD
Filed July 11, 1949
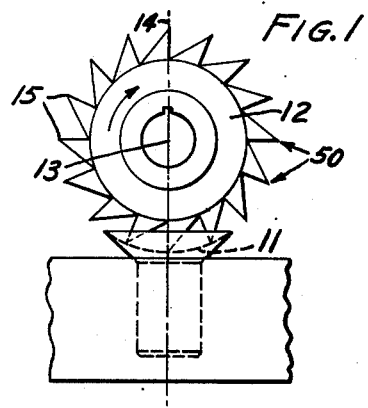
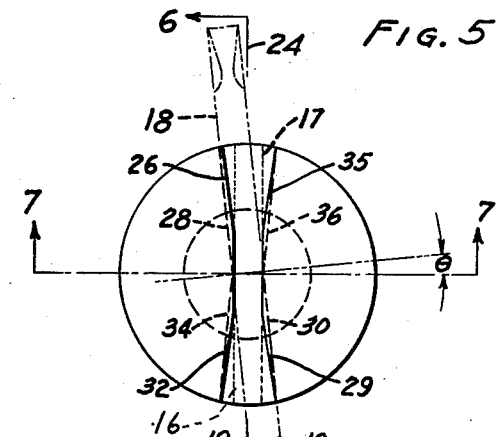
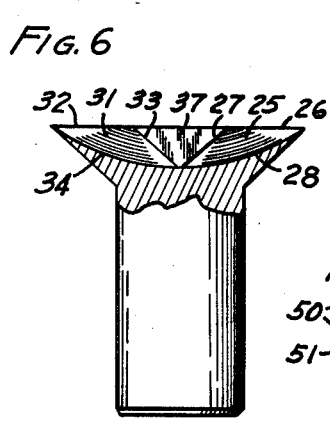
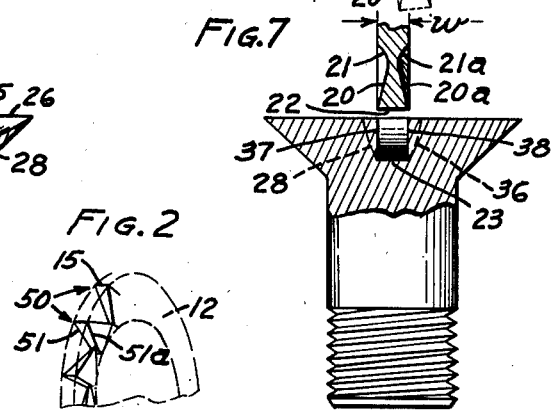
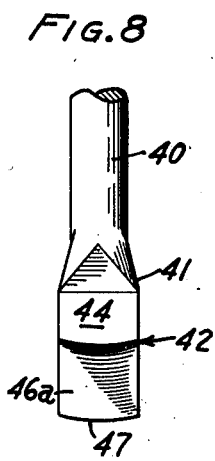
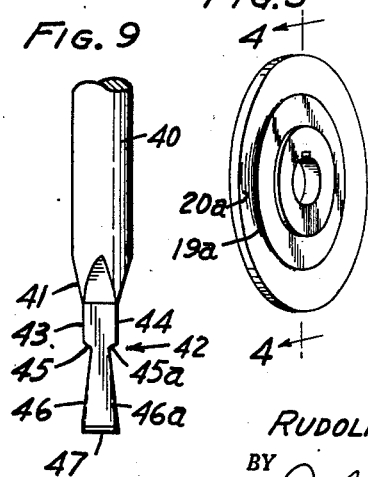
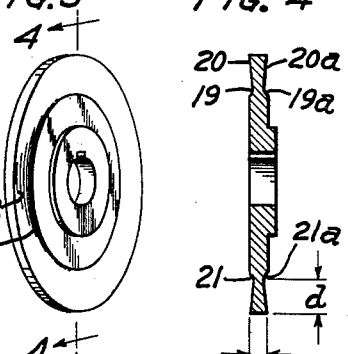
INVENTOR,
RUDOLPH M. VAUGHN,
BY
D. Gordon Angus
ATTORNEY.

Patented May 11, 1954

2,677,985

UNITED STATES PATENT OFFICE 2,677,985

SLOTTED SCREWHEAD

Rudolph M. Vaughn, Newport Beach, Calif., assignor to Hi-Shear Rivet Tool Co., Hermosa Beach, Calif., a corporation of California Application July 11, 1949, Serial No. 104,033

6 Claims. (Cl. 85—45)

This invention relates to driven screws of the type having a slotted head for receiving a driver, and has for an object to provide such a screw in which there is obtained a substantial surface contact of the driver with the slot wall. A related object is to overcome the usual tendency for a component of force to push the driver out of the slot when the turning torque is applied.

In the case of the ordinary type of slotted screw head, wherein straight slot walls are provided to receive the screw driver, the driving end of the driver must ordinarily have a certain amount of clearance within the slot to enable it readily to be inserted. Accordingly, the driver has a substantial amount of angular play within the slot in its two directions of turning. This results in point contacts between the driver and the walls of the screw slot while driving, the two opposite forward points or edges of the driver being in contact with corresponding surfaces of the slot. This tends to wear down and round off the driving edges and points of the driver and results in a component of force tending to push the driver out of the slot.

Attempts have been made to overcome this usual tendency of a driver to be forced out of a slot while driving. One expedient, for example, has been to undercut the slot somewhat to overcome the effect of an outward component of force pushing the driver out. Such undercutting, however, has not overcome the undesired point contacts of the driver with the slot walls. An attempt has even been made to make the base of the slot arcuate so that the deepest part of the slot is at the center of the screw head and the shallowest is at the sides. This expedient, however, even when combined with ordinary undercutting at the center, does not provide more than point contact.

In accordance with my present invention, I overcome the disadvantages of the previous types of slotted heads by the provision of a unique form of slot wherein contact between the driver and the slot walls is had over a substantial surface area of the slot walls, rather than merely at points or edges.

My novel slot has an arcuate base and diverges outwardly from the center. Furthermore, it is undercut at the sides where the driving torque is applied, though not at the center. The slot takes a driver having an arcuate bottom and sides which diverge toward the bottom. A feature is the provision of surface contact with the driver at opposite sides of the center of the slot.

The slot can conveniently be made with a milling cutter having diverging peripheral edges by twisting or turning the milling cutter through a slight angle from either side of the longitudinal axis of the slot.

The foregoing and other features of my invention will be better understood from the following detailed description and the accompanying drawing of which:

Fig. 1 is a side elevation view of a screw blank held in a jig, and having a transverse slot cut in its head by a rotary cutter;

Fig. 2 is a perspective view of a blank from which the cutter of Fig. 1 is made;

Fig. 3 is a cross-section view taken at line 3—3 of Fig. 2;

Fig. 4 is a perspective view showing part of a cutter made from the blank of Fig. 2;

Fig. 5 is a plan view of the slotted head of the screw of Fig. 1, illustrating the making of special additional cuts in accordance with my invention;

Fig. 6 is an elevation view, partially in cross section, taken at line 6—6 of Fig. 5;

Fig. 7 is another elevation view partially in cross section taken at line 7—7 of Fig. 5, this view showing the screw threads formed in the blank;

Fig. 8 is a front elevation view of a driver useful for driving the screw according to my invention; and Fig. 9 is an end elevation view of the driver.

The configuration of the slotted screw head according to this invention can be readily understood by describing how it can be made; although it should be understood that the invention is not limited to the particular method by which the slot is made.

Referring to Fig. 1, this shows a screw blank 10 of an ordinary well known flat head type. An arcuate slot 11 is provided across the head of the screw, and this can conveniently be done by an operation of a rotary milling cutter 12, the center 13 of which can be brought straight down symmetrically along the longitudinal center axis 14 of the screw blank so as to cut the slot symmetrically along a diameter of the screw head.

Cutter 12, shown partially in perspective in Fig. 2, is a milling cutter which can be made from a blank in the general form of a circular disc (Fig. 3) on each side of the periphery of which there is removed an annular portion, these being numbered 19 and 19a respectively. Each of these portions 19 and 19a is a surface of revolution, and their peripheral areas are frusto-conical, providing cross sections bounded by straight lines 20 and 20a, respectively, extending from the respective edges of the periphery and converging inwardly toward the center. The extent of these straight portions 20 and 20a should be sufficient so that the radial distance $d$ will be at least as great, and preferably greater, than the depth of the slot. Inside the straight portions 20 and 20a, the surfaces are then brought out to the flat surfaces of the disc along lines which may be curved as at 21 and 21a, respectively. The thickness $w$ of the disc, at its periphery, should correspond with the width of the straight vertical sided slot to be cut in the screw head.

The teeth 50 are cut in the periphery of the blank as shown in Fig. 2, so that the slot which is cut in the screw head will conform with the shape of the periphery of the blank. Accordingly, the leading edges 51 and 51a of the teeth conform with the shape of surfaces 20 and 20a of the blank. The transverse cutting edges 15 of the teeth are straight lines extending transverse to the axis of the cutter; and since the length of the edges 15, being the same as the width $w$ in Fig. 4, is the widest part of the teeth, they will determine the width of the slot. The leading edges 51 and 51a act as generators of oppositely directed surfaces of revolution, in this case, conical surfaces, which are disposed at opposite edges and opposite ends of the slot, each such surface having a contour such as surface 46a (Fig. 9). The surfaces so oppositely disposed have a common central axis, which is the axis of rotation of the milling cutter when it is turned so as to give the desired undercuttings. Accordingly, there will be cut a slot having the circular arc 11 with a flat bottom 23 and with straight parallel vertical walls extending upwardly perpendicular from the arcuate flat bottom, the tops of these walls being represented by the dotted lines 16 and 17 in Fig. 5. The central axes of the surfaces of revolution are disposed above the head of the screw. In the preferred embodiment of the invention, these central axes of revolution are perpendicular to the longitudinal axis of the screw head, and also pass through the center of curvature of the bottom of the slot. This center of curvature also lies above the screw head at the longitudinal axis of the screw head.

From the position of symmetry in which the cutter was held while making the initial cut described above, the axis of rotation of the milling cutter 12 will now be twisted or turned in both directions, through a small angle above the axis coinciding with the longitudinal axis of the screw. This angle of twist may conveniently be about five degrees, but it will be understood that a few degrees more or less would not depart in principle or effect from the invention. Fig. 5 shows the cutter (in outline form, without showing the individual teeth) twisted through an angle $\theta$ of about five or more degrees counterclockwise about the longitudinal screw axis. This will correspondingly modify the slot by removing material, and will create two portions of substantially conical surface which are almost planar, one in the upper hemisphere of the screw head and the other in the lower hemisphere of the screw head (with reference to Fig. 5). One of these portions of substantially conical surface is the surface 25 (Fig. 6), bounded by the perimeter 26, 27 and 28. The other portion of substantially conical surface will be similar in size and dimensions, but diagonally opposite in position; being bounded by the perimeter 29 and 30 of Fig. 5 (the perimeter line corresponding to line 27 of Fig. 6, not being shown). For convenience of terminology the surface 25 is herein referred to as surface A, and the surface having boundaries 29 and 30 is referred to as surface B. These surfaces, being conical, are surfaces of revolution.

In a similar manner, the milling cutter 12 will then be turned clockwise and past the center position by the same angle $\theta$ from the position of symmetry that it was turned counterclockwise; and in thus doing, there will be formed two more segmental frusto-conical surfaces of which the surface 31, herein referred to as surface C, bounded by the perimeter 32, 33 and 34, is shown in Fig. 6. (The corresponding diagonally opposite surface having the perimeter lines 35 and 36, herein referred to as surface D, does not appear in Fig. 6.) The surfaces A, B, C and D are herein referred to as engaging surfaces since they are for engagement by a driver. It is noted that the two engaging surfaces on the same side of the slot are non-parallel to each other.

During this milling operation just described, there will be left uncut by the cutter the two opposite substantially triangular planes 37 and 38, after the cutter 18 has been turned in both directions off center. These substantially triangular portions will be in the form of opposite parallel planes with vertical opposed walls parallel to the longitudinal axis of the screw, and are the portions of the original slot which had been cut according to Fig. 1. Due to the small angle through which the axis of the cutter is rotated about the longitudinal axis of the screw, lines 27 and 33 will be nearly straight lines. However, since the leading edges 51 and 51a of the teeth generate a cone, and surface 27 is a plane which intersects the cone at an angle to the cone's axis which is greater than the angle between the leading edges and the cone's central axis, lines 27 and 33 are slightly curved but nearly straight and form a substantially isosceles triangle with the upper edge of the slot. Another congruent triangle will be formed on the opposite side of the slot.

Lines 26, 29, 32 and 35 are intersections between a plane (i. e., the screw's upper surface) and the conical surfaces formed by the cutter. Since the said plane is parallel to the cone's axis, these lines are slightly parabolic. Lines 28, 30, 34, and 36 are the lower edges of the conical engaging surfaces. They are formed by the outer pointed edge of the cutting teeth and are circular arcs. The arcs which are disposed on opposite sides and opposite ends of the slot, that is, lines 28 and 30, 34 and 36, lie in parallel planes, and when viewed in plan from directly above the screw head (Fig. 5), appear to be straight lines. These apparent straight lines are parallel to each other, and the perpendicular distance between them is equal to the perpendicular distance between the planar central regions 37 and 38. The perpendicular distance between all such parallel straight lines is equal.

It will be apparent that the four equal sized surfaces A, B, C and D, which have been cut by the milling cutter 12, as represented by surfaces 25 and 31 in Fig. 3, will be undercut with reference to the original vertical walls of the slot, that is, the lines 28, 30, 34 and 36 will be undercut with reference to the upper edges 26, 29, 32 and 35 of the slot. This feature of the construction enables a driver to be used which will not tend to be forced out of the slot while applying the usual turning torque; and for this purpose, the driving end of the driver should have a configuration similar to that of the blank (Figs. 3 and 4) from which the milling cutter 12 was made.

The undercut driver-engaging surfaces were thus generated in pairs, the members of a pair being disposed in opposite walls of the slot and also on diametrically opposite sides of the longitudinal axis of the screw head. The slot will be wider at the bottom than at the top at the driver-engaging surfaces when measured perpendicular to the transverse axis of the head. The upper edges of the slot diverge from the transverse axis of the slot toward the periphery.

The amount of divergence of the frusto-conical surfaces 20 and 20a is not critical; but for convenience, the angle of divergence should not be too great or else the width of the slot at the center would have to be excessively large in order to accommodate the end of the driver. A convenient angle for each of the lines 20 and 20a (Fig. 3) to make with reference to the normal to the head of the screw, can be in the neighborhood of about ten (10) degrees.

Figs. 8 and 9 illustrate the driving end of such a driver. It comprises the usual cylindrical shank or the like 40, tapered at 41 down to the driving end 42. The driving end comprises opposite parallel flat walls 43 and 44, which may conveniently be spaced apart by the width $w$ of the milling cutter 18. At the lower ends of walls 43 and 44, the driver is converged inwardly along surfaces 45 and 45a which correspond to the converging surfaces 21 and 21a of Fig. 4. The diverging flat surfaces 46 and 46a down to the bottom of the driver correspond to the respective surfaces 20 and 20a of Fig. 3, and should be similarly dimensioned. The bottom surface 47 of the driver is a flat arcuate surface, corresponding to the flat arcuate surface 23 of the slot.

It will be recognized that the driver may readily be inserted into the slot in its position of symmetry, as shown by the position of the cutter in Fig. 7; and when its arcuate surface 47 is brought down against surface 23 of the slot, the driver may then be turned in the slot by an angular amount corresponding to the amount of undercutting. Thus, to drive the usual righthand thread, the driver will be turned clockwise (with reference to Fig. 5); and when thus turned, there will be surface contact between the frusto-conical walls of the driver and of the slot, these walls of the slot being planes C and D. Likewise, when the driver is turned the other way to turn the screw in the opposite direction, its corresponding opposite frusto-conical driving surfaces will make surface contact with the remaining two slot surfaces A and B.

When the screw is being driven counterclockwise, the lower peripheral edges of the driver will be in engagement with the respective curved edges 34 and 36 of the slot; and since these slot edges are considerably undercut with reference to the surface of the screw head, the driver cannot be forced out by the usual component of force in the outward direction. This will facilitate the driving and obviate the necessity for the usual considerable inward pressure which must ordinarily be exerted on a screw driver, and will furthermore avoid the usual undesired disengagement of the driver from the slot. Moreover, and perhaps more important, is the great amount of surface contact between the driver and the screw slot over the segmental frusto-conical driving areas. This will save the driver and prevent turning of the driver edges or points such as usually occurs in ordinary driving operations. Moreover, it will save the surface of the slot itself from being chewed up by the point of the driver.

It will be recognized that by my invention, I have provided a slotted screw and screw driver arrangement which readily permits insertion and restriction of the driver into and out of the slot, when in the central position; but when the driver is turned off center, it will be effectively locked and held within the slot.

It should be understood that the invention is not limited to the particular configurations and arrangements shown in the drawings and described in the specification which are by way of illustration rather than of limitation. Modifications will readily suggest themselves for particular uses. For example, the arcuate slot need not terminate at the periphery of the screw head, but could, if desired, terminate within the periphery of the screw head, or even below the top of the head. Furthermore, the construction is not limited to flathead screws but could be used with other types of screw heads, such as the well known roundhead screw. The undercut surfaces A, B, C and D need not be in the form of the particular portions of conical surfaces illustrated but instead might be given some other suitable shape. For example, planar surfaces might be used. However, if the surfaces A, B, C and D should depart materially from the constructions illustrated, it may be desirable to provide a correspondingly modified form of driver. Moreover, the arcuate base 23 of the slot need not necessarily be flat as made by the straight edges 15 of the cutter teeth, but instead, could be rounded somewhat, as if the teeth edges 15 were somewhat rounded.

It should be understood that the invention is not limited to the particular method of forming the slot which has been illustrated and described but that some other suitable method of making it might be used instead.

I claim:

1. A screw head having a longitudinal axis and comprising a slot extending along a transverse axis perpendicular to the longitudinal axis across the top of the head, said slot having opposite walls and an arcuate bottom between and intersecting said walls, the arcuate bottom having a center of curvature above the head at said longitudinal axis, a pair of undercut driver-engaging surfaces one of which is in one wall on one side of the longitudinal axis and the other of which is in the other wall on the diametrically opposite side of the longitudinal axis, the upper edge of each driver-engaging surface lying at the surface of the head and the lower edge of each driver engaging surface lying at and intersecting the arcuate bottom and each upper edge overlying its respective lower edge, whereby the width of the slot measured perpendicular to the transverse axis at the driver-engaging surfaces is greater at the bottom than at the top of the slot, said driver engaging surfaces each having substantially the shape of a portion of a cone, said cones each having a central axis above the head which passes through and is substantially perpendicular to the longitudinal axis, the upper edges of the engaging surfaces diverging from the transverse axis in the direction of the periphery of the screw head.

2. A screw head according to claim 1 in which there are four undercut driver-engaging surfaces.

3. A screw head having a longitudinal axis and comprising a slot extending along a transverse axis perpendicular to the longitudinal axis across the top of the head, said slot having side walls and an arcuate bottom between and intersecting said walls, the arcuate bottom having a center of curvature above the head at said longitudinal axis, and a pair of undercut portions one of which is in one wall on one side of the longitudinal axis and the other of which is in the other wall on the diametrically opposite side of the longitudinal axis, each of said undercut portions of a wall being a fragment of a surface of revolution said surfaces of revolution each having a central axis above the head which passes through and is substantially perpendicular to the longitudinal axis, the bottom being wider at the periphery of the head than at the central region, the width of the slot measured perpendicular to the transverse axis at the undercut portions being greater at the bottom than at the top of the slot, the upper edges of the undercut portions diverging from the transverse axis toward the periphery.

4. A screw head according to claim 3 in which the top edges of the side walls are substantially parallel to each other at the central region and diverge away from each other toward the periphery.

5. A screw head according to claim 3 in which the top edges of the opposite walls on opposite sides of the longitudinal axis are substantially parallel to each other.

6. A screw head according to claim 3 in which the central axis of every surface of revolution passes through the center of curvature of the arcuate bottom.

References Cited in the file of this patent

UNITED STATES PATENTS

| Number | Name | Date |
|---|---|---|
| 132,946 | Armstrong | Nov. 12, 1872 |
| 2,106,278 | Redmer | Jan. 25, 1938 |
| 2,142,185 | Fieg | Jan. 3, 1939 |
| 2,206,085 | Fieg | July 2, 1940 |
| 2,224,659 | Stoll | Dec. 10, 1940 |
| 2,239,352 | Cherry | Apr. 22, 1941 |
| 2,285,460 | Purtell | June 9, 1942 |
| 2,289,560 | West | July 14, 1942 |
| 2,304,704 | O'Leary | Dec. 8, 1942 |
| 2,369,852 | Purtell | Feb. 20, 1945 |
| 2,369,853 | Purtell | Feb. 20, 1945 |

FOREIGN PATENTS

| Number | Country | Date |
|---|---|---|
| 10,612 | Germany | Aug. 20, 1880 |
| 22,718 | Great Britain | Oct. 5, 1909 |